United States Patent [19]
Maurice

[11] Patent Number: 4,789,857
[45] Date of Patent: Dec. 6, 1988

[54] ACTIVE MATRIX DISPLAY SCREEN WITH LINE AND COLUMN REDUNDANCY

[76] Inventor: Francois Maurice, 125 Boulevard de la Corniche, 22700 Perros Guirec, France

[21] Appl. No.: 7,193

[22] Filed: Jan. 27, 1987

[30] Foreign Application Priority Data

Jan. 27, 1986 [FR] France .................. 86 01081

[51] Int. Cl.[4] .................................. G09G 3/36
[52] U.S. Cl. .................................. 340/784
[58] Field of Search .......... 340/784, 752, 718, 811, 340/713, 714; 350/332, 333

[56] References Cited

U.S. PATENT DOCUMENTS

4,082,430 4/1978 Schultess et al. .............. 340/784
4,368,523 1/1983 Kawate ...................... 350/333

FOREIGN PATENT DOCUMENTS

8502931 7/1985 World Int. Prop. O. .

*Primary Examiner*—Gerald L. Brigance
*Attorney, Agent, or Firm*—Oblon, Fisher, Spivak, McClelland & Maier

[57] ABSTRACT

Active matrix display screen with row and column redundancy. The display screen comprises a first and second transparent plate (10, 24) between which is inserted a liquid crystal. On a first plate (10) are deposited a matrix of elements (32) each comprising a transistor (20) and a conductive block (22), lines of addressing electrodes organized in rows (14) and in columns (12). The lines of electrodes are connected together at their ends by resistances which make it possible to avoid the effects of row or column breaks.

4 Claims, 3 Drawing Sheets

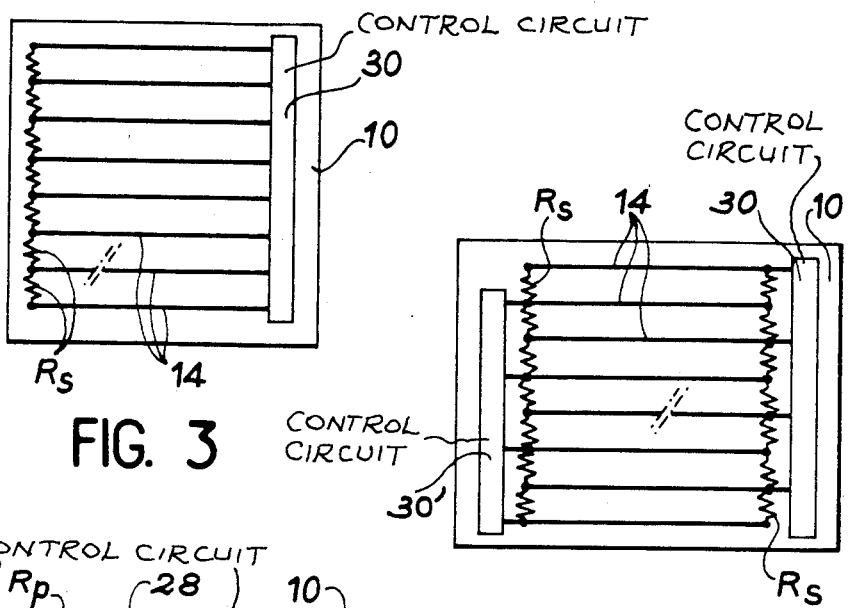
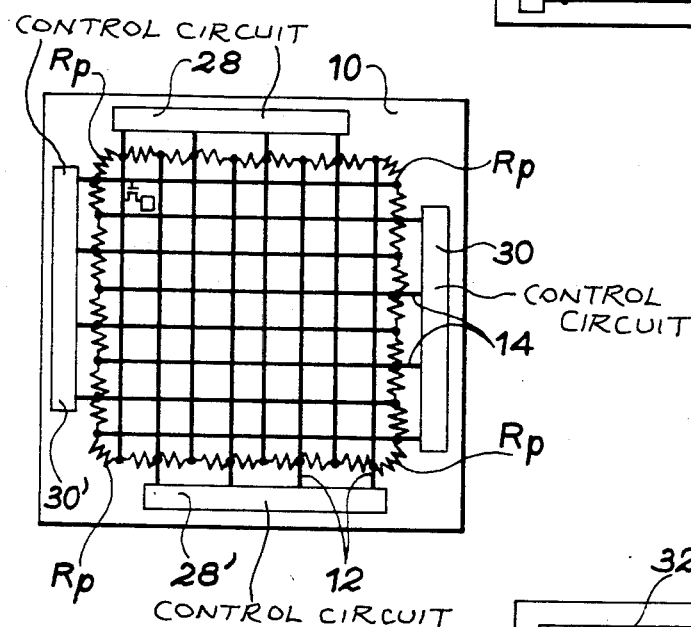
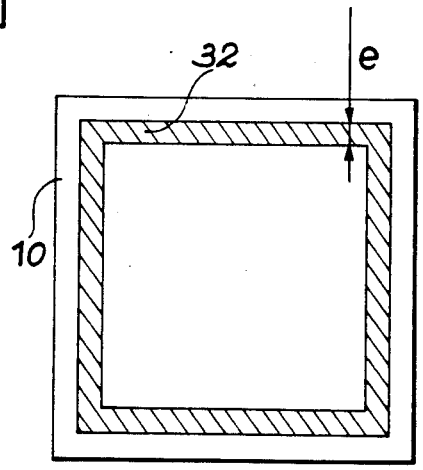
FIG. 3
FIG. 4
FIG. 7
FIG. 8

ACTIVE MATRIX DISPLAY SCREEN WITH LINE AND COLUMN REDUNDANCY

BACKGROUND OF THE INVENTION

1. Field of the Invention

This invention has as its object an active matrix display screen with row and column redundancy.

It finds an applicatin in optoelectronics in the production of liquid crystal displays used particlarly as converters of electrical data into optical data.

2. Discussion of the Background

An active matrix display screen generally comprises two plates between which is inserted an electrooptical material such as a liquid crystal. On one of the plates is a matrix of transparent conductive blocks, thin-film transistors, a family of conductive addressing rows and a family of conductive addressing columns. Each transistor has a gate connected to a row, a source connected to a block and a drain connected to a column. On the second plate is a counterelectrode.

Such a structure is shown in FIG. 1. Represented there in a simplified manner is a lower plate 10 carrying conductive coluns 12 and conductive rows 14, a transistor 20 and a conductive block 22 and an upper plate 24 covered with a counterelectrode 26.

In FIG. 2 is shown the equivalent diagram of the overall display screen an element of which has been described in figure 1. This screen comprises conductive columns 12, connected to a control circuit 28 delivering suitable video voltages, and conductive rows 14, connected to a control circuit 30 delivering line addressing voltages. In dashed lines, picture points 32 of the display screenhave beenshown. they are located at the intersection of rows 14 and conductive columns 12. These picture points 32 (also called "pixels") each comprise a transistor 20 and a capacitor. One of the capacitor plates consists of a conductive block 22 deposited on plate 10 and the other capacitor plate consists of a counterelectrode 26 deposited on the other plate 24.

With reference to this figure, it is seen that in case a conductive line (either a column 12, or a row 14) is broken, the broken line portion is no longer brought to the control potetial delivered by control circuit 28 or 30.

This results in the nonfunctioning of the pixels connected to this line portion, which is reflected by a very visible spurious effect on the display screen. This effect can, for example, be a white streak corresponding to the defective pixels connected to the broken line portion on a black screen background.

SUMMARY OF THE INVENTION

The invention has precisely the aimof remedying this drawback. For this purpose, it proposes an active matrix display screen that makes it possible to avoid a break of a conductive row or column from rendering unusable the pixels isolated by this break. This result is obtained by connecting together the ends of the conductive rows and columns with resistances.

More specifically, the invention has as its object and active matrix display screen comprising in a known way, a first and second transparent plate between which is inserted a liquid crystal, the first plate comprising conductive blocks defining display elements and lines of addressing electrodes organized in rows and in columns, these lines being connected to control circuits of the display, the second plate comprising a counterelectrode. According to the main characteristic of the active matrix display screen according to the invention, the lines of electrodes are connected together at their ends by resistances.

According to a preferred embodiment of the invention, each resistance has a value Rs greater than the output impedance of the control circuits, much greater than the resistance of each line of electrodes and such that Rs/2 is much less than Ra/n where Ra is the characteristic impedance of each display element seen from the row or column under consideration and n the number of elemets simultaneously active on the row or column.

A variant of the display screen according to the invention makes it possible to provide an antistatic protection. For this purpose, the network of resistances connecting together the rows and the network of resistances connecting the columns, are interconnected with a resistance Rp of value equal or close to resistance Rs.

According to a preferred embodiment, the set of resistances Rs and Rp consists of a resistive strip going around the display screen, this strip being in contact with the rows and columns.

BRIEF DESCRIPTION OF THE DRAWINGS

The invention will be brought out better on reading the following description, given purely by way of illustration, inno way of limiting, with reference to the accompanying drawings which follow up on FIGS. 1 and 2 already described and in which:

FIG. 3 is a diagrammatic view of the conductive rows deposited on the first plate of a display screen according to the invention, FIG. 4 is another possible arrangement of the conductive rows, FIG. 7 shows the set of resistances used to obtain an antistatic protection, FIG. 8 diagrammatically represents a resistive strip making it possible to obtain the connecting resistances between rows and columns.

DESCRIPTION OF THE PREFERRED EMBODIMENTS

In FIG. 3, conductive rows 14 have been shown deposited on a first plate 10 of a display screen according to the invention. These rows 14 hav a resistance $R_L$ and are connected to a control circuit 30.

According to the main characteristic of theinvention, rows 14 are connected together at their ends by resistances Rs.

Also, the conductive columns deposited on first plate 10 of the display screen are connected together at their ends by resistances Rs (not shown).

These resistances Rs create a row and/or column redundancy making it possible, in case of breaking of a row and/or column, to bring the portion of the broken row and/or column to a potential equal to the half-sum of the potentials of the adjacent rows and/or columns.

In FIG. 4, another possible arrangement of the conductive rows has been shown. Lines 14 are connected alternately to circuit 30 which is placed on the right side of plate 10 and to a control circuit 30' which is placed opposite circuit 30 onthe left side of plate 10.

Thus, first plate 10 of the display screen comprises, alternately, a conductive row 14 connected to control circuit 30, a conductive row 14 connected to control circuit 30', a conductive row 14 connected to control circuit 30, etc.

Rows 14 are connected together at their two ends by resistances Rs.

As in the variant of FIG. 3, these resistances create a row redundancy making it possible, in case of row is broken, to bring the portion of the broken row to a potential equal to the half-sum of the potentials of the adjacent rows connected to the same control circuit as the broken row.

Also, conductive columns 12 can be connected alternately to two control circuits placed at the top and on the bottom on plate 10.

Resistances Rs must verify several conditions so as not to harm the good functioning of the display screen.

First of all, resistance Rs must be greater than the output impedance of the control circuits. This condition makes it possible to remain within limits of use of the control circuits and not to overload these latter. Then resistance Rs must be much greater than the resistance of the rows and/or columns. This condition makes it possible for the unbroken rows and columns to remain equipotential. Finally, resistance Rs must be much less than 2Ra/n where Ra is the characteristic impedance of a display element [and] n the number of these elements simultaneously active on the row or column. This latter condition makes it possible for the portion of the broken line to be brought to a potential equal to the half-sum of the potentials of the adjacent lines.

The control of the display screen according to the invention will now be described in case an electrode line (row or column) is broken.

Figure 1:
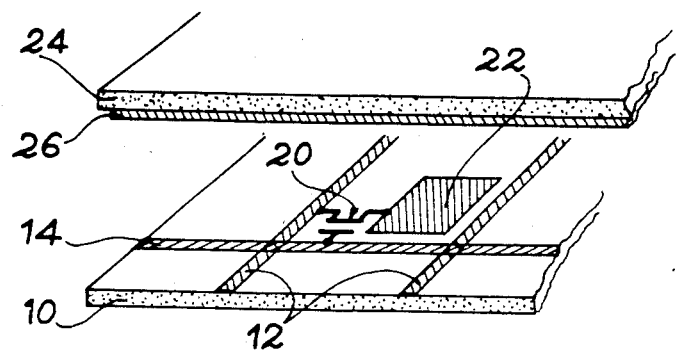
Figure 2:
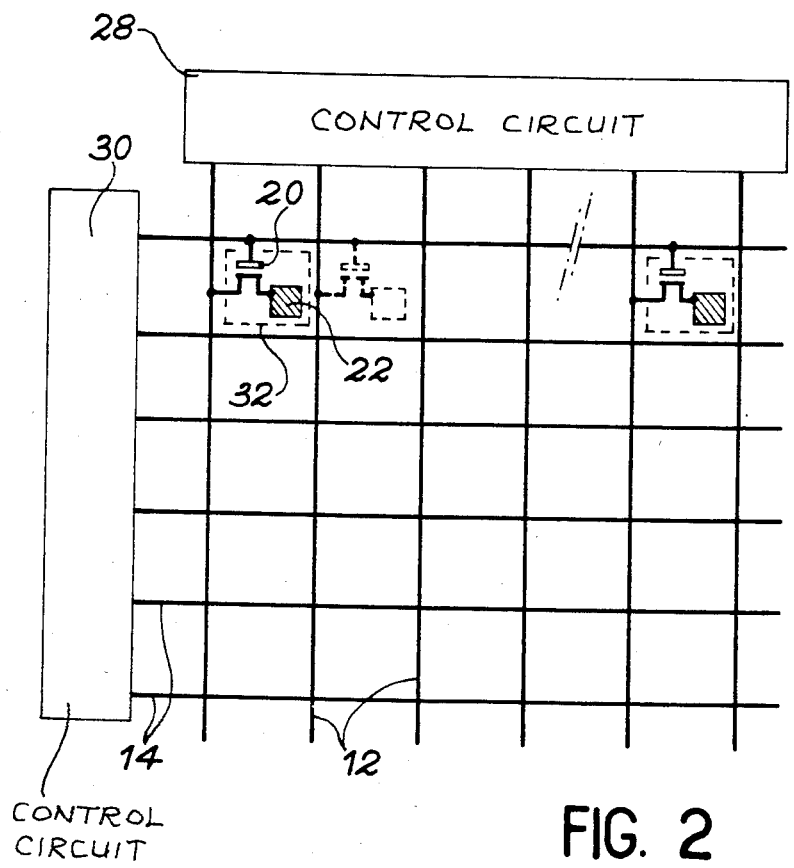
Figure 5:
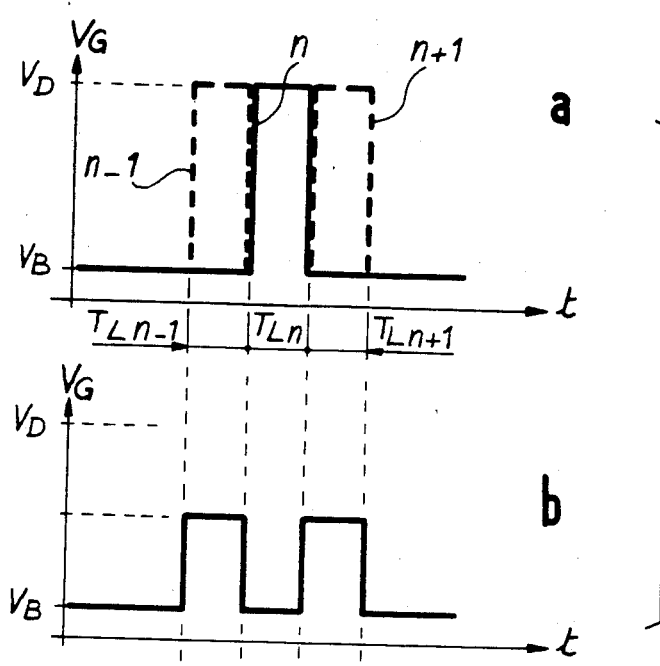
FIG. 5 shows timing diagrams illustrating the control of a broken conductive row portion.

When control circuits 28 or 30 deliver composite video control signals, the broken line portion is brought to a potential equal to the half-sum of the potentials of the adjacent lines. The pixels isolated by the break are thus controlled by an average video potential which approaches the control video potential that the line receives. More specifically, in FIG. 5, timing diagrams have been shown that illustrate a control of a broken conductive row portion. Part a represents the voltage $V_G$ applied to a row. Index n represents the position of the row. Voltage $V_G$ is a signal in the form of pulses with a blocking value $V_B$ and an unblocking value $V_D$. Each picture point of row n is activated during time interval $TL_n$ during which the row voltage $V_G$ is equal to $V_D$. Shown in dashed lines are the voltages applied to rows n−1 and n+1 and in solid line the voltage applied to row n.

The control signals delivered by control circuit 28 to conductive columns 12 are video signals (not shown).

Part b represents the voltage applied to the gate of the transistors connected to the portion of assumed broken row n. Thanks to the row redundancy created by resistance Rs, the portion of the broken row is brought to a potential equal to the half-sum off the potentials of row n−1 and row n+1. As can be seen, this potential remains less than unblocking voltage $V_D$. Under these conditions, the broken row portion is brought to a potential that does not make it possible to render the corresponding picture points active. This control is therefore not applicable to the display screen according to the invention.

Figure 6:
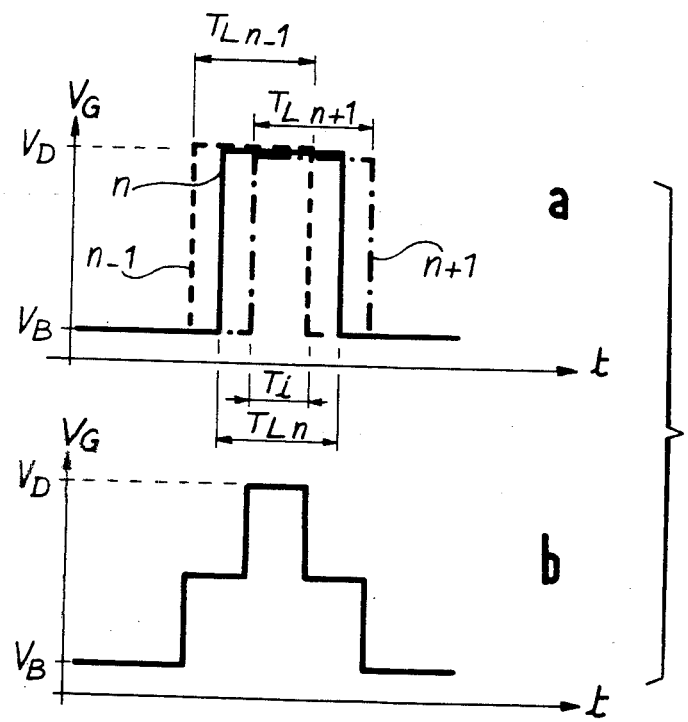
FIG. 6 shows timing diagrams illustrating a variant of the control of a broken conductive row portion.

In FIG. 6, the timing diagrams corresponding to a possible control have been shown.

Part a represents voltage $V_G$ applied to rows n−1, n, n+1. This voltage further exhibits an nblocking value $V_D$ and a blocking value $V_B$. Each picture point of row n is activated during interval $TL_n$ during which voltage $V_G$ is equal to $V_D$.

The voltages applied respectively to rows n−1 and n+1 have been represented in dashed rows. These lines n−1 and n+1 have line addressing time $TL_{n-1}$ and $TL_{n+1}$.

The line addressing times $TL_{n-1}$, $TL_n$ and $TL_{n+1}$ overlap so that during an interval $T_i$ corresponding to the superposition of the three addressing times, the three rows $L_{n-1}$, $L_n$ and $L_{n+1}$ receive, at the same time, a voltage $V_G$ equal to the unblocking voltage.

Part b represets the voltage to which a portion of assumed broken row n is brought. This voltage is equal to the half-sum of the voltages of rows n−1 and n+1. As can be seen, during interval $T_i$, the half-sum of the potentials of row n−1 and of row n+1 is equal to unblocking voltage $V_D$. The broken row portion is thus brought to a potential that makes it possible to render the picture points connected to this row portion active.

In FIG. 7, lines of electrodes organized in conductive columns 12 and in conductive rows 14 have been represented. Conductive columns 12 are connected alternately to control circuit 28 which is placed on top of first plate 10 and to control circuit 28' which is placed on the bottom.

Conductive rows 14 are connected alternately to control circuit 30 which is placed on the right and to control circuit 30' which is located on the left.

All the conductive rows an all the conductive columns are connected together, at their ends, by networks of resistances Rs. The networks of resistances that connect together rows 14 and the network of resistances that connect together columns 12 are interconnected by resistances Rp.

The value of Rp is equal or close to that of Rs. The maximum impedance between any row 14 and any column 12 is on the order of nL+nC/2 Rs with nL and nC corresponding respectively to the number of rows and columns of the display screen. This impedance tends to equalize the potentials of the rows and of the columns during the production and handling of the display screen. This results in protecting the screen from the accumulation of static electricity which could appear during the handling or during the production of the display screen. The appearance of such charges at the intersections of the rows and columns is thus eliminated. This interconnection of the networks of resistances Rs by resistances Rp therefore makes it possible to obtain an antistatic protection of the display screen.

Now, an embodiment of the resistances Rs and Rp will be described.

The conditions imposed at Rs cause some constraints relating to the making of these resistances and of the rows and columns.

The first condition calls for resistance Rs to be greater than the output impedance of the control circuits. The value of Rs should therefore be not too small. For example, it will be greater or equal to 100 KΩ when the control circuit cannot deliver more than 0.1 mA for each row or column under a control voltage of 10 volts.

The second condition involves columns 12 and rows 14 having a resistive value much les than Rs. For example, the resistances of the lines of electrodes should be on the order of 1 to 10 kΩ. This constraint practically excludes the use of conductive oxide such as indium and tin oxide (ITO) for the making of the rows or of the columns.

The combination of all these conditions and these constraints necessitates the making of the conductive rows and columns of an nonresistive metal such as aluminum.

In FIG. 8, an example of embodiment of the networks of resistances has been shown in the case of an antistatic protection such as described with reference to FIG. 7. The set of resistances Rs and Rp is obtained by a resistive strip 32 going around the plate. This strip 32 is in contact with rows 14 and columns 12. It is made preferably of indium and tin oxide. For example, when the picture points have a width on the order of 250 $\mu$m and when the resistive value of Rs is ont he order of 100 K$\Omega$, width e of strip 32 is on the order of 25 $\mu$m.

This strip 32 can be obtained by depositing ITO during he first stage of the process for producing the matrix of the first plate. In this way, resistive strip 32 produces an antistatic protection during the following stages of the process for making the screen.

I claim:

1. Active matrix display screen comprising a first (10) and a second (24) transparent plate between which is inserted liquid crystal material, the first plate (10) comprising conductive blocks (22) defining display elements (32) and lines of addressing electrodes organized in rows (14) and in columns (12), these lines being connected to circuits for controlling the display, the second plate (24) comprising a counterelectrode (26), the screen being characterized by the fact that the lines of electrodes are connected together at their ends by resistances and that said circuits for controlling the display place addressing signals on lines of electrodes, the addressing signal for a given line of electrodes overlapping in time the addressing signals of at least two lines on each side of said given line so that if said given line is broken, an addressing signal for the given line is produced from the overlapping portions of addressing signals of adjacent lines passing through said resistances.

2. Active matrix display screen comprising a first (10) and a second (24) transparent plate between which is inserted liquid crystal material, the first plate (10) comprising conductive blocks (22) defining display elements (32) and lines of addressing electrodes organized in rows (14) and in columns (12), these lines being connected to circuits for controlling the display, the second plate (24) comprising a counterelectrode (26), this screen being characterized by the fact that the lines of electrodes are connected together at their ends by resistances, wherein each resistance has a value Rs greater than an output impedance of the control circuits, greater than the resistance of each row of electrodes, and such that Rs/2 is less than Ra/n where Ra is the characteristic impedance of each display element seen fromt he row or column under consideration and n the number of elements simultaneously active on the row (14) or the column (12).

3. Active matrix display screen comprising a first (10) and a second (24) transparent plate between which is inserted liquid crystal material, the first plate (10) comprising conductive blocks (22) defining display elements (32) and lines of addressing electrodes organized in rows (14) and in columns (12), these lines being connected to circuits for controlling the display, the second plate (24) comprising a counterelectrode (26), the screen being characterized by the fact that the liens of electrodes are connected together at their ends by resistances, wherein each resistance has a value Rs and wherein the resistances connecting together the rows (14) and the resistances connecting together the columns (12) are interconnected by a resistance Rp of value substantially equal to the resistance Rs.

4. Display screen according to claim 3, wherein the resistances Rs and Rp consist of a restrictive strip (8) going around the display screen, this strip being in contact with the rows (14) and the columns (12).

* * * * *